United States Patent [19]
Blewett et al.

[11] 3,905,855
[45] Sept. 16, 1975

[54] RIGID FIBROUS PANEL AND METHOD OF MAKING SAME
[75] Inventors: Donald A. Blewett, Granville; Richard G. Adams, Newark, both of Ohio
[73] Assignee: Owens-Corning Fiberglas Corporation, Toledo, Ohio
[22] Filed: Nov. 1, 1972
[21] Appl. No.: 302,944

[52] U.S. Cl. ............... 156/323; 100/38; 156/583; 428/236; 428/247; 428/256; 428/285; 428/920
[51] Int. Cl.²............................................ C09J 5/00
[58] Field of Search ....... 161/41, 89, 151, 167, 170, 161/403, DIG. 4; 156/62.2, 246, 323, 583; 100/38

[56] References Cited
UNITED STATES PATENTS

| | | | |
|---|---|---|---|
| 2,613,397 | 10/1952 | Borkland | 161/DIG. 4 |
| 2,959,511 | 11/1960 | Finger | 161/DIG. 4 |
| 2,969,301 | 1/1961 | Finger | 161/DIG. 4 |
| 3,064,308 | 11/1962 | Caspersen | 161/DIG. 4 |
| 3,071,180 | 1/1963 | Finger et al. | 161/DIG. 4 |
| 3,092,203 | 6/1963 | Slayter et al. | 161/DIG. 4 |
| 3,096,161 | 7/1963 | Morrison et al. | 161/DIG. 4 |
| 3,144,376 | 8/1964 | Plumberg et al. | 161/156 |
| 3,236,714 | 2/1966 | Traut | 156/323 |

Primary Examiner—George F. Lesmes
Assistant Examiner—James J. Bell
Attorney, Agent, or Firm—Carl G. Staelin; John W. Overman; Allen D. Gutchess, Jr.

[57] ABSTRACT

A rigid fibrous panel and a method of making same are provided. The rigid panel has particular adaptability for cold storage walls with the panel being self-supporting and washable and having fire-retardant and insulating characteristics with high impact-resistance. The panel comprises a layer of highly densified glass fibers held in a rigid form by a binder with a washable plastic film adhered to the face of the layer. The plastic film can be adhered to the fibrous layer by an intermediate adhesive sheet which can also serve as an ultraviolet radiation barrier. A metal mesh or hardware cloth can also be used in or with the fibrous layer for rodent control. The method of making the panel includes densifying or compressing a fibrous layer, curing a binder in the layer to form a rigid self-sustaining mass or board, and adhering a plastic sheet or film substantially at the same time to the layer in one operation. The binder is cured with the fibrous layer compressed by heat applied to both sides of the layer, with the heat applied to the side having the plastic film being initially retarded or delayed which has been found to prevent wrinkling of the plastic film on the layer.

10 Claims, 5 Drawing Figures

PATENTED SEP 16 1975 3,905,855

RIGID FIBROUS PANEL AND METHOD OF MAKING SAME

This invention relates to a rigid fibrous panel which is washable, has high-impact resistance, and exhibits fire retardant and insulating properties, and to a method for making same.

Glass fibers, when in discontinuous form, have commonly existed as compressible, deformable, flexible masses or batts, i.e. building insulation. Such fibers have also been frequently found in more compacted masses or layers for ceiling tiles or panels which are self-supporting but still somewhat flexible and having readily compressible or deformable surface characteristics. More recently, ceiling tiles have been produced with higher densities, in the order of 25 pcf., but again such tiles are flexible, with surfaces exhibiting relatively low resistance to impact and also exhibiting a high degree of porosity.

The fibrous panel in accordance with the invention is more highly densified than heretofore and exhibits a high degree of rigidity with hard, high impact-resistant surfaces not previously associated with panels made of mineral fibers and specifically glass fibers. The new panel exhibits rigidity and has impact resistant surfaces comparable to good quality wood panels and, when provided with a plastic film on an exposed face thereof, is readily washable. The fibrous panel also has reasonably good insulating properties and exhibits greater fire retardant properties than wood. In addition, the plastic film surface of the panel can be textured in a variety of patterns for decorative purposes.

The particular characteristics of the new fibrous panel make it especially suitable for use in walls of cold storage chambers or freezers. Proper sanitary conditions can be readily maintained through the washability of the plastic film while the fire retardant and insulating properties are especially suitable for cold storage applications. The fibers also substantially prevent the possibility of the panel being unduly brittle and subject to cracking at low temperatures. The plastic film can be adhered to the fibrous layer by an adhesive sheet which can also serve as a radiation barrier. A metal mesh or hardware cloth can also be used in or with the fibrous layer for rodent control.

A method of making the fibrous panel according to the invention is also provided. In the production of the panel, the plastic film or sheet is laid on a caul plate with a plurality of pads or pelts of glass fibers having an uncured binder placed thereover, with an adhesive sheet, if used, therebetween. This combination is then placed between heated platens of a press, in which the fibers are compressed or densified, the binder is cured, and the plastic film is adhered to the densified layer. These all occur substantially at the same time as the heated platens are moved together and held for a period of time sufficient to cure the binder. In order to make the fibrous panel in a single operation, however, it has been found that the application of heat to the plastic film must be delayed temporarily. To achieve this, an insulating layer or sheet is placed between the lower platen and the caul plate. This layer inhibits flow of heat from the lower platen to the composite layer and prevents wrinkling of the plastic film as otherwise results. This discovery has enabled the production of the fibrous panel in the single operation instead of necessitating a subsequent operation to apply the plastic film to the previously densified fibrous layer.

It is, therefore, an object of the invention to provide an improved, rigid, fibrous panel having surfaces highly resistant to impacts.

Another object of the invention is to provide a rigid, fibrous panel which exhibits insulating and fireresistant properties.

A further object of the invention is to provide a rigid, fibrous, building panel having a washable surface.

Yet another object of the invention is to provide a panel of glass fibers having a plastic film on a face thereof, which panel is rigid, self-supporting, exhibits high impact resistance on the surfaces, is washable, and has insulating and fire-resistant characteristics.

Still another object of the invention is to provide an improved method for making a fibrous panel which consists of a highly densified layer of fibers in a rigid, permanent shape with a film of plastic adhered tightly to a surface thereof.

Still a further object of the invention is to provide a method of making a fibrous panel with a plastic film face in one operation.

Many other objects and advantages of the invention will be apparent from the following detailed description of preferred embodiments thereof, reference being made to the accompanying drawings, in which.

Figure 1:
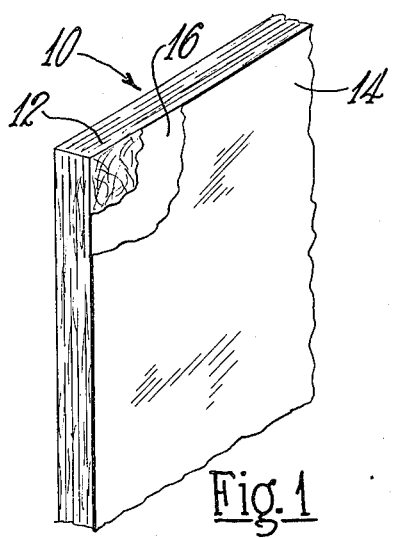
FIG. 1 is a fragmentary view in perspective of a fibrous panel according to the invention, with parts broken away.

Referring to FIG. 1, a rigid building panel according to the invention is indicated at 10 and includes a highly densified fibrous layer 12 with a plastic film or sheet 14 adhered to a surface thereof. The film 14 can be adhered to the fibrous layer 12 by adhesive shown in the form of a phenolic-bonded paper 16. The layer 12 consists of discontinuous fibers held in a permanent rigid shape by a cured binder. The layer has a density in the order of 35–60 pcf. and exhibits high impact resistance, the resistance being similar to that of a good quality wood panel, by way of example. The layer also exhibits good insulating qualities —better than plywood— because of its fibrous character and, further, is highly fire retardant. The fibrous layer 12 itself, by way of example, has a flame spread rating in the order of 12–15, while the plastic film 14 has a flame spread rating of less than 20. This provides the composite panel 10 with a rating under 25 and, therefore, is classified as a Class I fire retardant material.

The layer 12 is made from uncured pelts or pads of fibers which are highly densified. For example, to produce the layer 12 in a thickness of one-quarter inch, five uncured pelts of fibers each having a thickness of 3 inches and an apparent density of three-quarters pcf.

are compacted to the one-quarter inch thickness under a pressure of about 180 psi. The fibers of the pelts can be made by a conventional rotary process with diameterss in the range of 0.00027–0.00032 inch. A phenol-formaldehyde binder can be employed but the binder is uncured or only partially cured prior to the pelts being placed in a press and densified.

The plastic film or sheet 14 preferably is a polyvinylfluoride commercially known as Tedlar. The sheet has a thickness of 1 to 4 mils, preferably 2 mils, and iss substantially non-porous and washable, which is particularly necessary for cold storage and freezer applications. The polyvinylfluoride is preferred because it will withstand a molding or curing temperature in the order of 350°F. used in the forming press. It also is fire-resistant, as discussed above.

The sheet 16 is thicker and stiffer than the film 14 to help provide a smooth base or backing surface. It employs a heat-sofenable adhesive on both sides to provide a bond or "glue-line" between the film 14 and the layer 12. The sheet 16 is commercially available and preferably is black so as to effectively block ultraviolet radiation.

Figure 2:
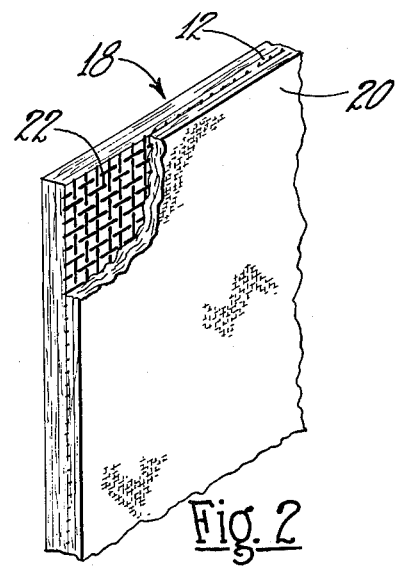
FIG. 2 is a view similar to FIG. 1 of a modified fibrous panel.

A slightly modified building panel 18 of FIG. 2 has the highly-densified fibrous layer 12 but a modified plastic film 20 having a textured surface formed in the press by a suitable textured layer placed in the press. The textured patterns possible for the plastic film 20 are substantially unlimited and can be produced by employing sheets or layers of such materials as felt, leather, canvas, linen, etc. in the press contiguous with the plastic film.

As shown, the panel 18 has a metal mesh or hardware cloth 22 associated with the fibrous layer 12, being placed within the pelts when the charge is made. This mesh prevents rodents and particularly rats from chewing through the panel 10 and gaining access to the interior of the cold storage chamber or freezer. Openings in the mesh 22 of one-quarter to one-half inch have been found to be suitable.

Figure 3:
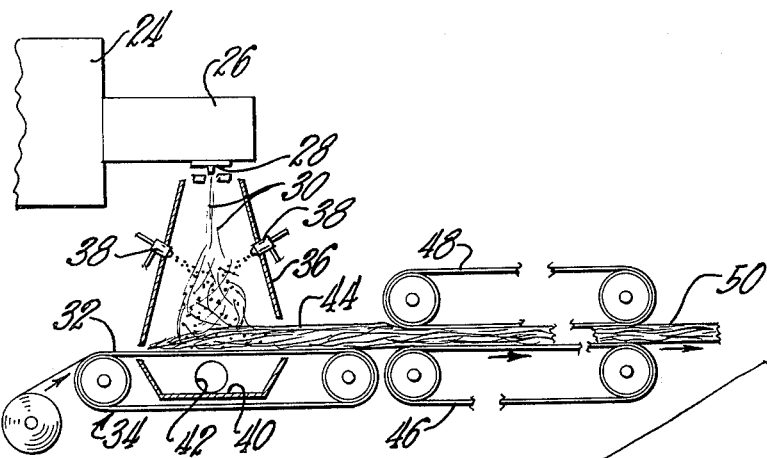
FIG. 3 is a schematic view in elevation, with parts in section, of a line from which layers or pelts of glass fibers for use in the panels of FIGS. 1 and 2 can be produced.

The pelts used to form the fibrous layer 12 can be produced on a fiber-forming line, schematically shown in FIG. 3. Glass is melted in a tank 24 and is supplied through a forehearth 26 to a fiber-forming unit 28. Fibers indicated at 30 are attenuated from the unit 28 and move downwardly, being deposited on a belt 32 of a conveyor 34. Binder is applied to the fibers in a forming hood 36 by suitable spray applicators 38. The fibers are gathered on the belt with the aid of a vacuum chamber 40 located below the upper run of the belt 32. A vacuum is maintained in the chamber 40 by an exhaust fan (not shown) communicating with an exhaust duct 42.

The fibers 30 with the binder applied thereto are moved toward the right, as viewed in FIG. 3, when deposited on the belt 32. A resulting layer 44 of the fibers 30 is then carried between two conveyors 46 and 48 which are spaced apart a predetermined distance to form the surfaces of the layer 44 in smooth, parallel relationship. A resulting pelt or pad 50 for the press charge is thereby produced. The pelt 50 can be carried away by an exit conveyor to a point where it can be cut to predetermined shape and size. Alternately, the pelt can be stored on a reel and transported closer to the press, at which time the pelt can be cut to size. In this state, the binder of the pelt is not cured, or at the most only partially cured, so that the pad is readily deformable; however, the binder still provides a degree of structural integrity for the pelt.

Since a plurality of the pelts or pads 50 are employed in contiguous, superimposed relationship in the press in order to make the fibrous layer 12, additional binder is sometimes applied to the surfaces of the pelts to assure that they will adhere to one another and not form a weak plane at their junctures. To assure that sufficient binder is located at the pelt surfaces, without adding additional binder, binder can be applied to the pelts in accordance with the technique disclosed in United States patent application Ser. No. 123,445, now abandoned of Plummer et al. In that technique, the fibrous layer from the fiber-forming unit is immersed in a pool of binder and subsequently passed through mechanical squeeze rolls to assure thorough distribution of the binder.

Figure 4:
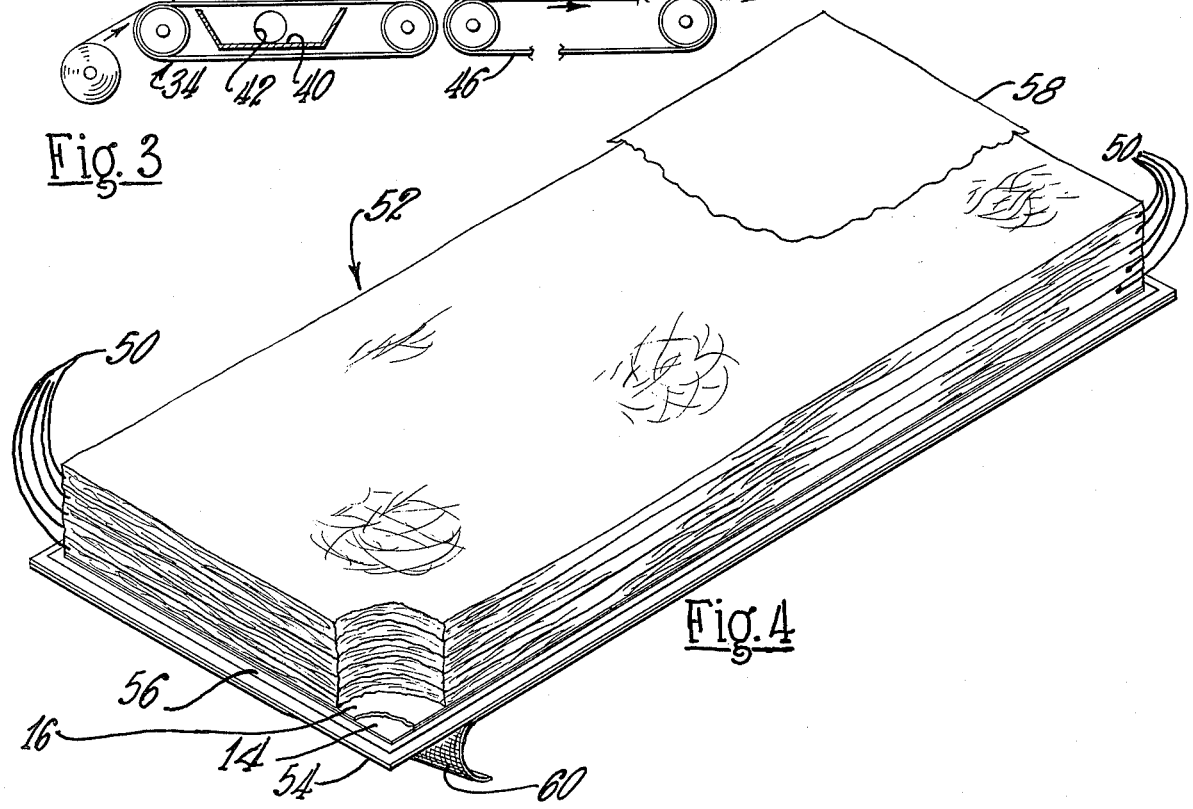
FIG. 4 is a view in perspective, with parts broken away, of a caul plate and charge, ready to be placed in a press, for producing a panel according to the invention.

A press charge for producing the panel 10 is indicated at 52 in FIG. 4. The charge 52 is built up on a caul plate 54 which provides a smooth, planar, heat-conducting, supporting surface for the charge 52. The plate 54 is, of course, larger in area than the pelts, in this instance measuring somewhat in excess of 4' by 8' in order to produce 4' × 8' building panels. By way of example, the caul plate can be made of 12–16 gauge steel.

A suitable release sheet 56 of paper is laid directly on the caul plate 54. The release paper can be of various suitable materials, one being a commercially available, brown, 40 pound paper. The release paper does not affect the operation of the press but merely assures ease in separation of the final panel from the surface of the caul plate 54. The plastic film 14 is next placed on the release paper 56 and the phenolic-bonded or adhesive sheet 16 is placed on the plastic film 14. The five fibrous pelts 50 are next placed on the adhesive sheet 16 in superimposed, contiguous relationship therewith and also with the plastic film 14. With the final panel 10 having a thickness of about one-quarter inch, it will be seen that the five pelts 50, each having a three inch thickness, are reduced to a thickness of about one-sixtieth the original thickness, and preferably from one-fortieth to one-eightieth the original thickness. This substantial reduction is required to result in the high-density panel having the high-impact and rigid characteristics achieved in accordance with the invention. Of course, other combinations of pelts can be used, for example, fewer thicker pelts or more thinner pelts. The particular combination of the five pelts, however, assures more uniform density throughout the panel, which might not be as readily achieved with fewer thicker pelts, whereas more thinner pelts would require more labor and handling.

After the plastic film 14, the adhesive sheet 16, and the pelts 50 are in place on the caul plate 54, a roller is preferably moved back and forth on the top surface of the upper pelt 50 to eliminate any excess air trapped between the pelts or within them. Subsequently, a top release sheet 58 of paper is laid over the upper surface of the uppermost one of the pelts 50. This release sheet should be sufficiently pervious to permit air to escape therethrough as the composite is subjected to the closing and molding pressures. A commercially-available, brown, 40 pound paper also has been found to be suitable for this release sheet.

IN accordance with the invention, a layer or sheet 60 of insulating material, such as canvas, is applied to the bottom of the caul plate 54, being adhered thereto, if desired. In such an instance, after the charge 52 thereon has been pressed and molded, and the resulting panel removed, the caul plate 54 with the canvas 60 can be cooled prior to receiving another charge and again being placed in the press. Rather than having the canvas 60 adhered thereto, however, a separate canvas belt can be employed which extends through the press above the lower platen and carries thereon the caul plates in sequence. This is a particularly advantageous expedient for higher production rates. However, the principle is nevertheless the same, namely that the insulating layer delays, retards, or inhibits flow of heat from the lower platen to the caul plate and to the composite layer thereon.

Figure 5:
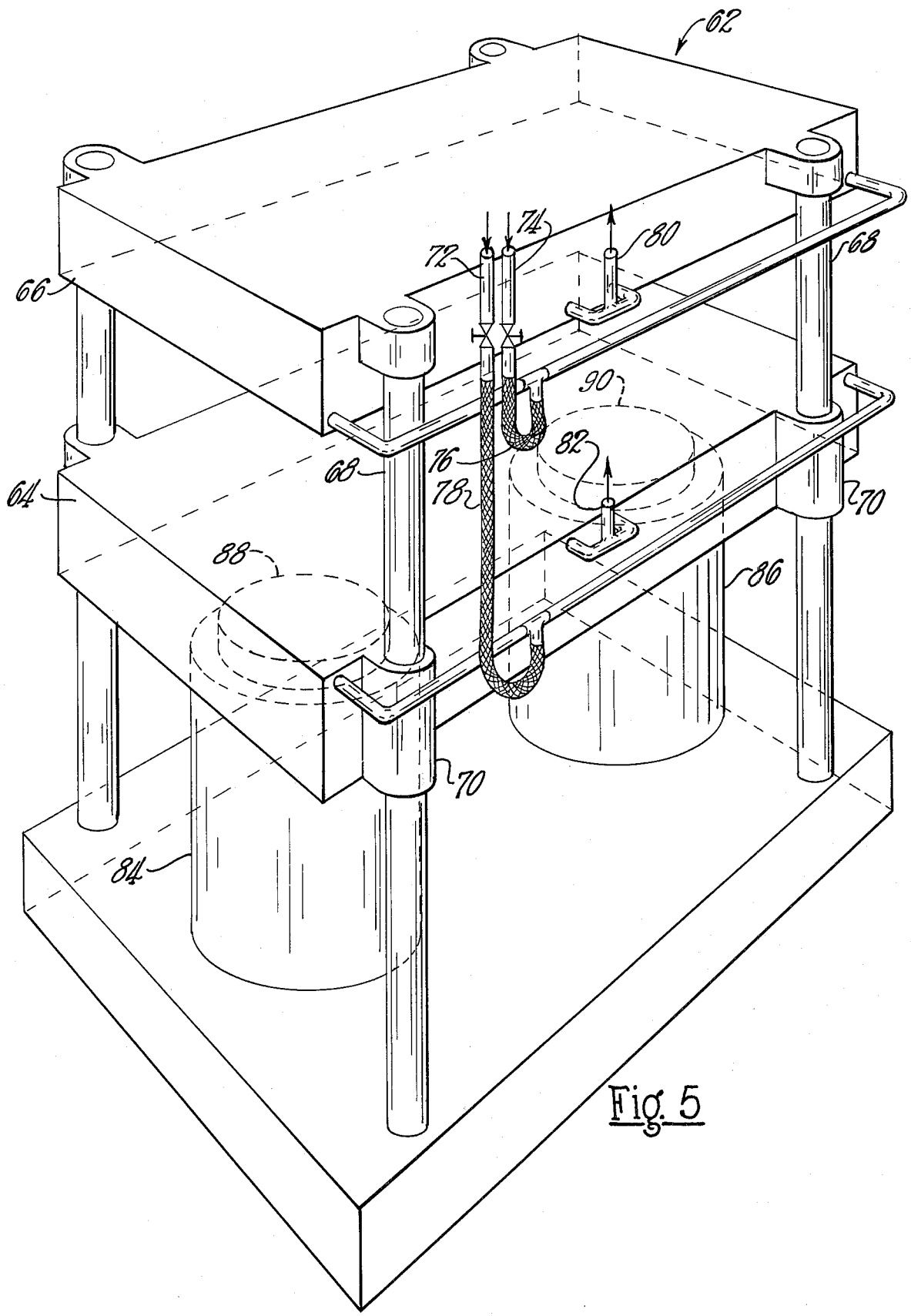
FIG. 5 is a schematic view in perspective of a press to receive the charge of FIG. 4, by means of which the panel according to the invention is made.

When the composite charge is ready, the composite, along with the caul plate 54 and the insulating layer 60 are moved into a press 62 of FIG. 5. The press 62 includes a lower-heated platen 64 and an upper-heated platen 66. The upper platen 66 is stationary, in this instance, being supported on posts or ways 68 while the lower platen 64 is movably guided by bearing blocks 70 on the ways 68. Both of the platens 64 and 66 are heated by a fluid, such as oil, supplied by lines 72 and 74 through flexible lines 76 and 78 to end portions of the platens 64 and 66 with the oil being exhausted through suitable conduits 80 and 82 from central portions of the platens. The oil passages located internally of the platens 64 and 66 are of a conventional nature and are not shown.

The lower platen 64 is moved in vertical directions by fluid-operated cylinders 84 and 86 having piston rods 88 and 90 supporting and engaging the lower platen 64. The number and size of the fluid-operated cylinders 84 and 86 depend upon the size of the platens 64 and 66 as well as the cylinder diametes and pressures employed. In a typical 4' × 8' platen, six of the cylinders 84 or 86 are employed, by way of example, In any event, the pressure needed to achieve the required densification of the pelts 50 is substantial, being in the order of 180 psi., to reduce the five pelts 50 to a thickness of one-quarter inch.

When the charge 52 and the caul plate 54 with the canvas 60 are placed in the press, the platens 64 and 66 are at an operating temperature in the order of 350°F., and preferably in a range of 300°–400°F. As the platens start to close, and contact the upper surface of the upper release paper 58, heat is substantially immediately transferred from the upper platen 66 to the upper pelt 50. On the other hand, heat from the lower platen 64 is delayed in being transferred because of the canvas 60, and the heat also must be applied to the caul plate 54, which is at a temperature substantially lower than the operating temperature of the platens, prior to heat being applied to the plastic film 14 and to the adhesive sheet 16 and the pelts 50. The retarded transfer of heat upwardly from the lower platen 64, as compared to the direct transfer of heat from the upper platen 66, prevents the plastic film 14 from creeping and wrinkling as would otherwise occur. Apparently, this is achieved because the adhesive sheet 16 becomes sufficiently tacky to prevent the plastic film 14 from creeping before the film 14 can become heated sufficiently to do so. In any event, it has been found that by delaying or retarding heat transfer by virtue of the insulating sheet 60, the fibrous layer 12 can be produced with the film 14 adhered thereto all in one operation. Further, the bond achieved between the film and layer in the single operation is much stronger than that obtained by densifying and producing the fibrous layer 12 in one operation and subsequently applying the plastic film 14 to a surface thereof in a subsequent, separate operation.

In order to produce the textured panel 18 of FIG. 2, a textured layer in the form of linen, leather, felt, canvas, etc. can be employed on the caul plate 54 in place of the lower release paper 56. The textures which can be achieved with this arrangement are substantially unlimited.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. A method of making a rigid building panel comprising positioning a substantially non-porous and washable plastic film on a caul plate, placing a plurality of layers of glass fibers having binder therein on said film, placing the combination of the caul plate, film, and fibrous layers in a press between heated upper and lower platens, placing an insulating layer only between the lower platen and the caul plate, moving at least one of said platens relative to the other to squeeze and densify the fibrous layers to a fixed thickness while applying heat to the fibrous layers to cure the binder and to adhere the plastic film to the fibrous layers, maintaining the heat and pressure for a time sufficient to cure the binder to an extent to form the fibrous layers into a self-supporting, unified, densified mass, said plastic film being capable of withstanding the curing heat, and removing resulting composite panel from the press.

2. A method according to claim 1 characterized by squeezing the fibrous layers to a thickness from one-fortieth to one-eightieth of their original thickness.

3. A method according to claim 1 characterized by maintaining said platens at a temperature of 300°–400°F.

4. A method according to claim 1 characterized by placing a textured layer between the caul plate and the film.

5. A method according to claim 1, characterized further by placing an adhesive sheet between said plastic film and said plurality of fiber layers before moving at least one of said platens relative to the other to adhere the plastic film to the fibrous layers by adhering the plastic film to the adhesive sheet and the adhesive sheet to the fibrous layers.

6. A method according to claim 1 characterized by applying additional binder to the surfaces of at least some of said layers of fibers prior to moving at least one of the platens relative to the other.

7. A method according to claim 1 characterized by placing a wire mesh between some of said fiber layers prior to moving at least one of the platens relative to the other.

8. A method of making a highly densified, rigid panel of permanent shape which comprises positioning a flexible plastic film on a surface, said film having a thickness of one to four mils and being capable of withstanding temperatures in the order of 350°F., placing an adhesive sheet over said flexible plastic film, placing a layer of glass fibers with binder on said adhesive sheet, and applying heat and pressure to the outer surface of said flexible plastic film insulating layer between said plastic film and the adjacent heat source, and to the outer surface of the fibrous layer to compress the fibrous layer while simultaneously adhering said flexible plastic film to said adhesive sheet and said adhesive sheet to the layer of fibers and curing the binder to produce a highly densified, rigid panel of permanent shape with said flexible plastic film adhered permanently to said fibrous layer.

9. A method according to claim 8 characterized by applying heat and pressure to the outer surface of said flexible plastic film and to the outer surface of the fibrous layer by placing them between two heated platens and placing an insulating layer only between the flexible plastic film and the heated platen for the film to delay transfer of heat from said heated platen to said flexible plastic film.

10. A method of making a highly densified, rigid panel of permanent shape which comprises positioning a polyvinylfluoride film on a surface, placing an adhesive sheet over said film, placing a layer of glass fibers with binder on said adhesive sheet, applying heat and pressure to the outer surface of said film and to the outer surface of the fibrous layer by placing them between two heated platens and placing an insulating layer only between the film and the heated platen for the film to delay transfer of heat from said heated platen to said film, the heat and pressure compressing the fibrous layer while simultaneously adhering said film to said adhesive sheet and said adhesive sheet to the layer of fibers, and curing the binder to produce a highly densified, rigid panel of permanent shape with said film adhered permanently to said fibrous layer.

* * * * *